(12) United States Patent
Long et al.

(10) Patent No.: US 11,832,618 B2
(45) Date of Patent: Dec. 5, 2023

(54) SPATIAL INSECT REPELLENT COMPOSITIONS

(71) Applicant: S. C. JOHNSON & SON, INC., Racine, WI (US)

(72) Inventors: Lina Long, Sturtevant, WI (US); Andrew Kotecki, Wauwatosa, WI (US); Joshua M. Hunnicutt, Racine, WI (US); Anthony Sosa, Racine, WI (US)

(73) Assignee: S. C. JOHNSON & SON, INC., Racine, WI (US)

( * ) Notice: Subject to any disclaimer, the term of this patent is extended or adjusted under 35 U.S.C. 154(b) by 281 days.

(21) Appl. No.: 17/142,600

(22) Filed: Jan. 6, 2021

(65) Prior Publication Data

US 2022/0211050 A1    Jul. 7, 2022

(51) Int. Cl.
| | | |
|---|---|---|
| *A01N 65/12* | (2009.01) | |
| *A01N 31/04* | (2006.01) | |
| *A01N 31/06* | (2006.01) | |
| *A01N 37/02* | (2006.01) | |
| *A01N 53/00* | (2006.01) | |
| *A01M 1/20* | (2006.01) | |

(52) U.S. Cl.
CPC ........... *A01N 65/12* (2013.01); *A01M 1/2061* (2013.01); *A01N 31/04* (2013.01); *A01N 31/06* (2013.01); *A01N 37/02* (2013.01); *A01N 53/00* (2013.01); *A01M 2200/012* (2013.01)

(58) Field of Classification Search
None
See application file for complete search history.

(56) References Cited

U.S. PATENT DOCUMENTS

| | | | |
|---|---|---|---|
| 4,968,487 A | 11/1990 | Yamamoto et al. | |
| 9,487,471 B1 | 11/2016 | Coelho et al. | |
| 10,206,393 B2 | 2/2019 | Goldblum et al. | |
| 2003/0138500 A1* | 7/2003 | Parker | A01N 59/02 514/65 |
| 2006/0029688 A1* | 2/2006 | Clarke | A01N 65/28 424/742 |
| 2006/0153891 A1 | 7/2006 | Gonzalez et al. | |
| 2013/0005688 A1 | 1/2013 | Saunders et al. | |
| 2014/0377385 A1 | 12/2014 | Enan | |

FOREIGN PATENT DOCUMENTS

| | | |
|---|---|---|
| CN | 104621195 A | 5/2015 |
| CN | 110742098 A | 2/2020 |
| CN | 113388184 A | 9/2021 |
| FR | 3110047 A1 | 11/2021 |
| JP | 4828800 B2 * | 11/2011 |
| JP | 2018109072 A | 7/2018 |
| JP | 2019099519 A | 6/2019 |
| WO | 2009117621 A1 | 9/2009 |
| WO | 2016175720 A1 | 11/2016 |
| WO | 2017003395 A1 | 1/2017 |
| WO | 2019193561 A2 | 10/2019 |
| WO | 2020085473 A1 | 4/2020 |

OTHER PUBLICATIONS

English abstract, JP4828800 B2 (Year: 2011).*
International Search Report and Written Opinion for PCT/US2022/011070, dated Apr. 22, 2022 (11 pages).
Database GNPD [Online] Mintel; Dec. 4, 2017, "Anti-Mosquito Protective Screen," XP55910759, Database accession No. 5271975, p. 2, line 1.

* cited by examiner

*Primary Examiner* — Bethany P Barham
*Assistant Examiner* — Barbara S Frazier
(74) *Attorney, Agent, or Firm* — Quarles & Brady LLP

(57) ABSTRACT

Disclosed herein are spatial insect repellent compositions comprising pyrethrins and about 5% to about 20% by weight p-menthane-3,8-diol.

15 Claims, No Drawings

SPATIAL INSECT REPELLENT COMPOSITIONS

CROSS REFERENCE TO RELATED APPLICATIONS

Not applicable.

REFERENCE REGARDING FEDERALLY SPONSORED RESEARCH OR DEVELOPMENT

Not applicable.

SEQUENCE LISTING

Not applicable.

BACKGROUND

1. Technology Field

The present disclosure relates to spatial pest repellent compositions and methods of repelling invertebrate pests from a space using the pest repellent compositions. The pest repellent compositions comprise at least pyrethrins, p-methane-3,8-diol, and solvent, and effectively repel invertebrate pests.

2. Description of the Background

Insect repellents have been used over the years to prevent insects from attacking humans, animals, and crops. Diseases transmitted by insects are a major health hazard. Insects (mosquitoes, flies, and the like) transmit a number of diseases caused by the exposure of the victim to infectious agents such as viruses (chikungunya virus, yellow fever, dengue fever, etc.), bacteria (Lyme disease, plague, etc.), and parasites (malaria, sleeping sickness, leishmaniasis, filariasis, etc.) carried by the insect.

For example, flying insects, such as mosquitoes, cause greater human suffering than any other organism—over one million people worldwide die from mosquito-borne diseases annually. Not only can mosquitoes carry diseases that afflict humans, they also transmit several diseases and parasites that affect other animals, such as dogs and horses. These include dog heartworm, West Nile virus (WNV), and Eastern equine encephalitis (EEE). In addition, mosquito bites may cause severe skin irritation resulting from an allergic reaction to the mosquito's saliva, causing inflammation and itching at the affected site, leading to the possible introduction of other disease-causing agents.

Invertebrate pest repellant compositions are available commercially. In addition to being repellents many of these compositions are also insecticides resulting in the death of invertebrate pests. Many of these compositions are used topically. In addition, various dispensing techniques are used to dispense such compositions. For example, insect coils, candles, or other burnable structures dispense these compositions during a burning process. However, this requires structures and other precautions for the appropriate handling of burnable materials. Another approach is to provide the composition in an aerosol container, then manually or via an automated mechanism intermittently spraying the composition, for instance, in an enclosure.

A variety of chemicals are known to have repellent and/or insecticidal properties. These include N,N-Diethyl-meta-toluamide (DEET), icaridin (also known as picaridin) (KBR3023), 3-[N-Butyl-N-acetyl]-aminopropionic acid, ethyl ester (IR3535), p-Menthane-3,8-diol (PMD), methyl anthranilate, benzaldehyde, dimethyl carbate, dimethyl phthalate, pyrethrins, some pyrethroid-type insecticides, such as cyphenothrin, deltamethrin, flumethrin, imiprothrin, permethrin, tefluthrin, and transfluthrin, and some natural insect repellents, such as citronella oil, neem oil, tea tree oil, cedar oil, citronella oil, clove oil, *eucalyptus* oil, geranium oil, lemongrass oil.

However, there is a need in the pest control market to move away from using insecticides that result in mosquito mortality, which may give rise to side effects in humans and harm the environment. Hence, a need exists for the development of compositions that repel, but do not kill, mosquitoes. There is also a need in the pest control market to provide insect repellents that are active upon vaporization, thereby avoiding topical administration or burning of the repellent composition.

SUMMARY

Embodiments of the current disclosure describe a spatial pest repellent composition comprising pyrethrins and about 5% to about 20% by weight p-methane-3,8-diol. In the present disclosure, Applicant demonstrates that the combination of these components unexpectedly provides both efficient pest repellency upon vaporization and results in less than 10% mortality.

In an embodiment, the spatial pest repellent compositions consists of pyrethrins, about 5% to about 20% by weight p-methane-3,8-diol, isopropyl myristate, hydrocarbon solvent, and antioxidant. In an embodiment the pyrethrins are present in about 0.1% to about 4.5% by weight. In an embodiment the p-menthane-3,8-diol is present at about 5% to about 15% by weight.

In an embodiment the isopropyl myristate is present at about 15-25% by weight. In an embodiment, the hydrocarbon solvent is present at about 62% to about 70% by weight. In an embodiment the antioxidant is present at about 0.5% to about 1.5% by weight. In an embodiment the hydrocarbon solvent is selected from the group consisting of aliphatic $C_9$-$C_{14}$ hydrocarbons, alicyclic $C_9$-$C_{14}$ hydrocarbons, naphtha, petroleum distillate, paraffins, iso-paraffins, isoparaffinic hydrocarbons, cycloparaffins, alkanes, iso-alkanes, cycloalkanes, and any combinations thereof.

In an embodiment the antioxidant is selected from the group consisting of 2,6-di-tert-butyl-4-methylphenol (BHT), 3-tert-butyl-4-hydroxyanisole (BHA), 2,2'-methylene-bis(4-ethyl-6-tert-butylphenol), 2,2'-methylene-bis-(4-methyl-6-tert-butylphenol), 4,4'-butylidene-bis(5-methyl-6-tert-butylphenol), 4,4'-methylene-bis(2-methyl-6-tert-butylphenol), 4,4'-thio-bis(3-methyl-6-tert-butylphenol), 4,4'-methylene-bis(2,6-di-tertbutylphenol), stearyl-β(3,5-di-tert-butyl-4-hydroxyphenol)-propionate, 1,3,5-trimethyl-2,4-6-tris(3,5-di-tert-butyl-4-hydroxybenzylbenzene), 1,1,3-tris(2-methyl-4-hydroxy-5-tert-butyl)-butane, tetrakis[methylene(3,5-di-tert-butyl-4-hydroxycinnimate)]methane, dilauryl thiodipropionate, and distearyl thiodipropionate and any combinations thereof.

In one embodiment, the spatial pest repellent composition comprises pyrethrins and about 5% to about 20% by weight p-menthane-3,8-diol, wherein at least 80% landing inhibition on a person of *Aedes albopictus* and *Culex quinquefasciatus* mosquitos is achieved within 15 minutes of exposure to the vaporized composition.

In an embodiment at least 85% landing inhibition on a person of *Culex quinquefasciatus* mosquitos is achieved within 15 minutes of exposure to the vaporized composition. In an embodiment 24 hours after exposure to the vaporized composition *Aedes albopictus* and *Culex quinquefasciatus* mosquitos experience about 10% mortality, or substantially 0% mortality.

In an embodiment the pyrethrins are present at about 0.1% to about 4.5% by weight. In and embodiment the p-menthane-3,8-diol is present at about 5% to about 20% by weight. In and embodiment the p-menthane-3,8-diol is present at about 5% to about 15% by weight. An embodiment further comprises isopropyl myristate. An embodiment further comprises an antioxidant. An embodiment further comprises about 62% to about 70% by weight hydrocarbon solvent. In an embodiment the spatial pest repellent composition does not comprise a propellant.

The current disclosure also describes a method of repelling an invertebrate pest from a space comprising heating a pest repellent composition comprising pyrethrins and about 5% to about 20% p-menthane-3,8-diol, wherein the pest repellent composition is vaporized into the space and invertebrate pests are repelled therefrom.

In an embodiment the pest repellent composition of the method comprises about 0.1% to about 4.5% by weight of pyrethrins. In an embodiment the pest repellent composition comprises about 5% to about 20% by weight of p-menthane-3,8-diol. In an embodiment, the heating comprises a heating element. In an embodiment, the heating element is a resistive heating element. An embodiment of the method further comprises isopropyl myristate. An embodiment further comprises an antioxidant. An embodiment further comprises about 62% to about 70% by weight hydrocarbon solvent. In an embodiment of the method the invertebrate pest is a mosquito. In an embodiment the mosquito is selected from the group consisting of *Culex quinquefasciatus* mosquitos and *Aedes albopictus* mosquitos.

In an embodiment the method results in about <10% mortality, or substantially 0% mortality, of *Culex quinquefasciatus* mosquitos and *Aedes albopictus* mosquitos after 24 hours of exposure to the vaporized pest repellent composition. In an embodiment at least 80% landing inhibition on a person of *Aedes albopictus* and *Culex quinquefasciatus* mosquitos is achieved within 15 minutes of exposure to the vaporized pest repellent composition. In an embodiment of the method at least 85% landing inhibition on a person of *Culex quinquefasciatus* mosquitos is achieved within 15 minutes of exposure to the vaporized pest repellent composition.

The current disclosure also describes an apparatus which comprises a heating element adjacent to a first end of a wick and a reservoir enclosing a second end of the wick, the reservoir comprising, and in contact with the second end of the wick, a pest repellent composition comprising pyrethrins and p-menthane-3,8-diol, wherein upon application of an electric current to the heating element the pest repellent composition is vaporized from the wick.

In an embodiment of the apparatus, the pest repellent composition comprises about 0.1% to about 4.5% by weight of pyrethrins. In an embodiment of the apparatus the pest repellent composition comprises about 5% to about 20% p-menthane-3,8-diol. In an embodiment the pest repellent composition further comprises at least one of isopropyl myristate, hydrocarbon solvent, and antioxidant. In an embodiment the heating element is a resistive heating element.

DETAILED DESCRIPTION OF THE DISCLOSURE

In the pest control area, it is known that households tend to suffer from the presence of invertebrate pests, particularly mosquitos. Also in the pest control area it is known that consumers desire a product experience that does not require topical application nor results in a burning smell or the presence of a flame or hot embers. Further, consumers and regulators desire, and/or require, products that are effective and safe. Most of the repellent and insecticide products available in the market tend to paralyze and kill mosquitoes. What is needed in the industry is a repellent composition that is effective in repelling mosquitoes. What is also needed in the industry is a repellent composition that does not result in mosquito mortality. What is also needed in the industry is a spatial repellent composition that does not require topical application. Therefore, it is important to develop a vaporizable spatial pest repellent composition that can effectively repel mosquitoes upon vaporization, without the killing activity, which present commercially available formulations do not provide. It has been found that pest repellent compositions comprising pyrethrins and p-methane-3,8-diol, presently know only for topical applications, may provide such a spatial benefit upon vaporization.

A spatial pest repellent composition according to an embodiment of the present disclosure is a composition consisting of pyrethrins, about 5% to about 20% by weight p-methane-3,8-diol, isopropyl myristate, hydrocarbon solvent, and antioxidant. The compositions described herein present a novel combination of pyrethrins and p-methane-3,8-diol, resulting in an improved repellent composition without the mosquito mortality normally associated with pyrethrins. In particular, the compositions described herein present a novel combination of topical repellents comprising pyrethrins and p-methane-3,8-diol resulting in an improved spatial repellent system, but without resulting in the normally expected death of mosquitoes, for example, Asian tiger and Southern house mosquitoes.

In certain embodiments, the spatial pest repellent composition consists of pyrethrins at about 0.1% to about 4.5% by weight of the total spatial pest repellent composition. In certain embodiments, the spatial pest repellent composition consists of pyrethrins at about 0.2% to about 1.0% by weight of the total spatial pest repellent composition. In certain embodiments, the spatial pest repellent composition consists of pyrethrins at about 0.3% to about 0.75% by weight of the total spatial pest repellent composition. While specific values chosen for this embodiment are recited, it is to be understood that, within the scope of the disclosure, the concentrations of the pyrethrins may vary to suit different applications. The concentration ranges of pyrethrins will vary based on the additional components of the spatial pest repellent, such as p-methane-3,8-diol, isopropyl myristate, hydrocarbon solvent, and antioxidant.

In certain embodiments, the spatial pest repellent composition consists of p-methane-3,8-diol at about 5% to about 20% by weight of the total spatial pest repellent composition. In certain embodiments, the spatial pest repellent composition consists of p-methane-3,8-diol at about 5% to about 15% by weight of the total spatial pest repellent composition. In accordance with an exemplary embodiment, the p-methane-3,8-diol is present in an amount of about 12% by weight of the total spatial pest repellent composition. While specific values chosen for this embodiment are recited, it is to be understood that, within the scope of the disclosure, the concentrations of the p-methane-3,8-diol may vary to suit different applications. The concentration ranges of p-methane-3,8-diol will vary based on the additional components of the spatial pest repellent, such as pyrethrins, isopropyl myristate, hydrocarbon solvent, and antioxidant.

In certain embodiments, the spatial pest repellent composition consists of isopropyl myristate at about 2% to about 30% by weight, about 10% to about 25% by weight, or about 15% to about 25% by weight of the total spatial pest repellent composition. In certain embodiments, the spatial pest repellent composition consists of isopropyl myristate at about 20% by weight of the total spatial pest repellent composition.

In certain embodiments, spatial pest repellent composition consists of hydrocarbon solvent at about 62% to about 70% by weight of the total spatial pest repellent composition. In certain embodiments, the spatial pest repellent composition consists of at least 62% by weight of a hydrocarbon solvent. In certain embodiments the hydrocarbon solvent may be selected from the group consisting of aliphatic $C_9$-$C_{14}$ hydrocarbons, alicyclic $C_9$-$C_{14}$ hydrocarbons, naphtha, petroleum distillate, paraffins, iso-paraffins, isoparaffinic hydrocarbons, cycloparaffins, alkanes, iso-alkanes, cycloalkanes, and any combinations thereof.

In certain embodiments, the spatial pest repellent composition consists of an antioxidant at about 0.5% to about 1.5% by weight of the total spatial pest repellent composition. In certain embodiments, the spatial pest repellent composition consists of an antioxidant at about 0.75% to about 1.25% by weight of the total spatial pest repellent composition. In certain embodiments the antioxidant may be selected from the group consisting of 2,6-di-tert-butyl-4-methylphenol (BHT), 3-tert-butyl-4-hydroxyanisole (BHA), 2,2'-methylene-bis(4-ethyl-6-tert-butylphenol), 2,2'-methylene-bis-(4-methyl-6-tert-butylphenol), 4,4'-butylidene-bis (5-methyl-6-tert-butylphenol), 4,4'-methylene-bis(2-methyl-6-tert-butylphenol), 4,4'-thio-bis(3-methyl-6-tert-butylphenol), 4,4'-methylene-bis(2,6-di-tertbutylphenol), stearyl-β(3,5-di-tert-butyl-4-hydroxyphenol)-propionate, 1,3,5-trimethyl-2,4-6-tris(3,5-di-tert-butyl-4-hydroxybenzylbenzene), 1,1,3-tris(2-methyl-4-hydroxy-5-tert-butyl)-butane, tetrakis [methylene(3,5-di-tert-butyl-4-hydroxycinnimate)]methane, dilauryl thiodipropionate, and distearyl thiodipropionate, or any combinations thereof.

The spatial pest repellent composition according to an embodiment of the present disclosure is a composition comprising pyrethrins and about 5% to about 20% by weight p-menthane-3,8-diol, wherein at least 80% landing inhibition on a person of *Aedes albopictus* and *Culex quinquefasciatus* mosquitos is achieved within 15 minutes of exposure to the vaporized composition.

In certain embodiments, at least 85% landing inhibition on a person of *Culex quinquefasciatus* mosquitos is achieved within 15 minutes of exposure to the vaporized composition comprising pyrethrins, and about 5% to about 20% by weight p-menthane-3,8-diol.

In certain embodiments, the spatial pest repellent composition comprises pyrethrins at about 0.1% to about 4.5% by weight of the total spatial pest repellent composition. In certain embodiments, the spatial pest repellent composition comprises pyrethrins at about 0.2% to about 1.0% by weight of the total spatial pest repellent composition. In certain embodiments, the spatial pest repellent composition comprises pyrethrins at about 0.3% to about 0.75% by weight of the total spatial pest repellent composition. While specific values chosen for this embodiment are recited, it is to be understood that, within the scope of the disclosure, the concentrations of the pyrethrins may vary to suit different applications. The concentration ranges of pyrethrins will vary based on the additional components of the spatial pest repellent, such as p-methane-3,8-diol, isopropyl myristate, hydrocarbon solvent, and antioxidant.

In certain embodiments, the spatial pest repellent composition comprises p-methane-3,8-diol at about 5% to about 20% by weight of the total spatial pest repellent composition. In certain embodiments, the spatial pest repellent composition comprises p-methane-3,8-diol at about 5% to about 15% by weight of the total spatial pest repellent composition. In accordance with an exemplary embodiment, the p-methane-3,8-diol is present in an amount of about 12% by weight of the total spatial pest repellent composition. While specific values chosen for this embodiment are recited, it is to be understood that, within the scope of the disclosure, the concentrations of the p-methane-3,8-diol may vary to suit different applications. The concentration ranges of p-methane-3,8-diol will vary based on the additional components of the spatial pest repellent, such as pyrethrins, isopropyl myristate, hydrocarbon solvent, and antioxidant.

In certain embodiments, the spatial pest repellent composition comprises isopropyl myristate at about 15% to about 30% by weight of the total spatial pest repellent composition. In an embodiment, the spatial pest repellent composition consists of isopropyl myristate at about 15% to about 25% by weight of the total spatial pest repellent composition. In certain embodiments, the spatial pest repellent composition comprises isopropyl myristate at about 20% by weight by weight of the total spatial pest repellent composition.

In certain embodiments, spatial pest repellent composition comprises hydrocarbon solvent at about 62% to about 70% by weight of the total spatial pest repellent composition. In certain embodiments, the spatial pest repellent composition comprises at least 62% by weight of a hydrocarbon solvent.

In certain embodiments, the spatial pest repellent composition comprises antioxidant at about 0.5% to about 1.5% by weight of the total spatial pest repellent composition. In certain embodiments, the spatial pest repellent composition comprises antioxidant at about 0.75% to about 1.25% by weight of the total spatial pest repellent composition.

In certain embodiments, the spatial pest repellent composition does not comprise a propellant.

In certain embodiments, 24 hours after exposure to the vaporized composition comprising pyrethrins and about 5% to about 20% by weight p-menthane-3,8-diol, *Aedes albopictus* and *Culex quinquefasciatus* mosquitos experience about <10% mortality, or substantially 0% mortality.

It is desirable to provide a spatial pest repellent composition comprising invertebrate pest repellents that do not result in the death of the invertebrate pest. It will be apparent to a person skilled in the art that the identification of a suitable combination of insecticides with synergistic components in the spatial pest repellent composition producing a repellent but not insecticidal composition is challenging and not obvious.

It is also desirable to provide a spatial pest repellent composition comprising invertebrate pest repellents that effectively inhibit landing of the invertebrate pest on a person. It will be apparent to a person skilled in the art that the identification of a suitable combination of insecticides in the spatial pest repellent composition producing an effective repellent is challenging and not obvious.

The combination of pyrethrins and p-methane-3,8-diol and other elements in the spatial pest repellent composition provide a composition having effective repellent effects against invertebrate pests, namely mosquitoes, upon vaporization of the composition. As used herein, "insect repellent" or "invertebrate pest repellent" refers to any compound, composition or formulation conferring on a location protection from insects when compared to the absence of treatment. For example, insect repellants prevent, repel, reduce the number of, alleviate, or mitigate insects and pests from a location. As used herein, "repel" when used in the context of "repelling an insect" means to repulse, ward off, drive back, or keep away from a treated locus, such that at any given time, there are fewer insects on a treated locus then on an untreated locus under the same conditions. Although an invertebrate pest or mosquito may land on or cross over a treated locus, the invertebrate pest or mosquito does not remain on the treated locus for a prolonged period of time or does not remain to probe, bite, or otherwise damage the locus. As used herein, a "location" or "locus" refers to a person, thing, or object on which the spatial pest repellent composition and mosquitoes may be found.

The currently disclosed spatial pest repellent composition exhibits an effective repellency against invertebrate pests, such as mosquitoes, while not killing the invertebrate pests. As used herein, an "effective repellent" or "effective repellency" refers to the landing inhibition of mosquitoes on a person and/or reduction of mosquitoes entering a room. An example of repellency may be the landing inhibition on a person of invertebrate pests, such as mosquitoes. As used herein, mosquito "landing" refers to mosquitoes sitting longer than 2 seconds of a person and/or mosquito biting of a person. In certain embodiments, landing inhibition is at least 80% after exposure to the composition. In certain embodiments, landing inhibition is about 80% to about 95%, or about 84% to about 92%, after exposure to the vaporized composition. In certain embodiments, landing inhibition is at least 85% after exposure to the vaporized composition. In certain embodiments, landing inhibition is of about 85% to about 95%, or about 86% to about 90% after exposure to the vaporized composition. An "effective landing inhibition" occurs when 80% or more landing inhibition is achieved within the test period.

Another example of an effective repellency may be the reduction of entry of mosquitoes into a room where the spatial pest repellent composition is present/has been released. In certain embodiments, the entry room reduction is about 10%, that is only 10% of mosquitoes released on the outside of a room entered the room containing the vaporized composition. An effective "room entry reduction" within a test period occurs when 80% or more entry reduction is achieved.

The novel and nonobvious combination of the normally topically used active ingredients pyrethrins and p-menthane-3,8-diol and other synergistic elements in a spatial pest repellent composition provides a composition having effective repellent effects against invertebrate pests when vaporized, while resulting in about <10% mortality, or substantially 0% mortality, of the invertebrate pests, namely mosquitoes. In other words, the spatial pest repellent composition of the present disclosure is a repellent when vaporized, but not an insecticide. As used herein, "insecticide" refers to a compound, composition or formulation that can destroy or kill insects or pests.

As used herein, "pest control" or "pest management" of invertebrate pests, namely mosquitoes, is considered to be an effective means for inhibition of mosquito bites or landing on an object, such as a person, or from entering a room. Further, as used herein, "pest control" or "pest management" of invertebrate pests, namely mosquitoes, is considered to be an effective means for, repelling, incapacitating, deterring, eliminating, alleviating, mitigating, reducing the number of, eradicating, knockdown, or killing invertebrate pests. As used herein, "effective composition" refers to a composition where the mosquito is repelled by the vaporized composition, and the vaporized composition does not kill the mosquito. As such, it is desirable to have a spatial pest repellent composition capable of repelling mosquitoes when vaporized, while avoiding insect mortality.

The currently disclosed spatial pest repellent composition exhibits an effective repellency against invertebrate pests, such as mosquitoes, while exhibiting about 10% mortality, or substantially no mortality or death. An example of no mortality may be twenty-four hours after exposure to the composition the mosquitoes experience substantially 0% mortality.

Presently disclosed is a method of repelling an invertebrate pest from a space comprising heating a pest repellent composition using a heating element. The pest repellent composition comprises pyrethrins and p-menthane-3,8-diol. In certain embodiments, the pest repellent composition is vaporized into the space and invertebrate pests are repelled therefrom.

In certain embodiments, the heating element is a resistive heating element.

In certain embodiments, the pest repellent composition of the method comprises about 0.1% to about 4.5% by weight of pyrethrins and about 5% to about 20% p-menthane-3,8-diol. In certain embodiments, pest repellent composition of the method comprises about 0.2% to about 1% by weight of pyrethrins and about 5% to about 15% p-menthane-3,8-diol.

In certain embodiments, the pest repellent composition of the method further comprises isopropyl myristate. In certain embodiments, the pest repellent composition of the method further comprises an antioxidant. In certain embodiments, the pest repellent composition of the method further comprises a hydrocarbon solvent at about 62% to about 70% by weight of the total pest repellent composition. In certain embodiments, the pest repellent composition of the method further comprises at least 62% by weight of hydrocarbon solvent.

In certain embodiments, the invertebrate pest is, but not limited to, an ant, a fly, a mosquito, a moth, or a spider.

In certain embodiments, the invertebrate pest is a mosquito. In certain embodiments, the mosquito is selected from the group consisting of *Culex quinquefasciatus* mosquitos and *Aedes albopictus* mosquitos.

In certain embodiments, the method results in about <10% mortality, or substantially 0% mortality, of *Culex quinquefasciatus* mosquitos and *Aedes albopictus* mosquitos after 24 hours of exposure to the vaporized pest repellent composition comprising pyrethrins and p-menthane-3,8-diol according to the present disclosure.

In certain embodiments, the method results in at least 80% landing inhibition on a person of *Aedes albopictus* and *Culex quinquefasciatus* mosquitos within 15 minutes of exposure to the vaporized pest repellent composition comprising pyrethrins and p-menthane-3,8-diol.

In certain embodiments, the method results in at least 85% landing inhibition on a person of *Culex quinquefasciatus* mosquitos within 15 minutes of exposure to the vaporized pest repellent composition comprising pyrethrins and p-menthane-3,8-diol.

Presently disclosed is also an apparatus comprising a heating element adjacent to a first end of a wick and a reservoir enclosing a second end of the wick, the reservoir comprising, and in contact with the second end of the wick, a pest repellent composition comprising pyrethrins and p-menthane-3,8-diol.

In certain embodiments, the pest repellent composition present in the apparatus comprises about 0.1% to about 4.5% by weight of pyrethrins and about 5% to about 20% p-menthane-3,8-diol. In certain embodiments, pest repellent composition present in the apparatus comprises about 0.2% to about 1% by weight of pyrethrins and about 5% to about 15% p-menthane-3,8-diol.

In certain embodiments, the pest repellent composition present in the apparatus further comprises at least one of isopropyl myristate, hydrocarbon solvent, and antioxidant.

In certain embodiments, the heating element is a resistive heating element.

Any of the embodiments described herein may be modified to include any of the structures, compositions, or methodologies disclosed in connection with different embodiments.

EXAMPLES

Formulation A is a composition containing about 0.6% pyrethrins, about 12% p-menthane-3,8-diol, about 20% isopropyl myristate, about 1% of antioxidant, and about 66% of hydrocarbon solvent.

Formulation B is a composition containing about 0.4% pyrethrins, about 12% p-menthane-3,8-diol, about 20% isopropyl myristate, about 1% of antioxidant, and about 66% of hydrocarbon solvent.

Formulation C is a composition containing about 0.2% pyrethrins, about 12% p-menthane-3,8-diol, about 20% isopropyl myristate, about 1% of antioxidant, and about 66% of hydrocarbon solvent.

For the purposes of this disclosure the terms "composition" and "formulation" may be used interchangeably Example 1

Efficacy of Formulations A-C Against Asian Tiger Mosquitos (*Aedes albopictus*

Methodology
Spatial Repellent Test

The spatial repellent test is carried out in two separate 30 m³ testing rooms, rooms 1 and 2. The rooms are equipped with at least one door connecting the two rooms. The light regime depends on the tested species. The room temperature and relative humidity are regulated.

The composition is placed in room 1 in the apparatus described herein, on the wall near the floor. Free flying aged female mosquitoes are released before the start of the test into neighbouring test room 2. The door between room 1 with the human volunteer and the composition and room 2 with the mosquitoes is opened. Mosquitoes released in room 2 are attracted to the volunteer, having bare arms and legs, in room 1.

Landing Inhibition Test

In the landing inhibition test, the number of mosquitoes landing on the volunteer and/or probing are counted. "Probing" refers to mosquitoes approaching or landing on volunteers for over two seconds. For testing purposes, of the mosquitoes that have entered room 1, landing refers to mosquitoes sitting longer than 2 seconds on the volunteer and/or the biting activity/bite preventive effect of mosquitoes.

Reduction of Room Entry

After the door between room 1 and room 2 is closed, the number of mosquitoes that entered room 1 is determined (counting is divided into unaffected and knocked-down mosquitoes) and mosquitoes are removed.

Mortality

A cage of aged female mosquitoes is placed in room 1 and exposed to the formulation for about 1 hour to observe whether insecticidal effects may be caused by contact/exposure to the formulation. The mosquito cages are then removed from room 1 and the insects are provided with cellulose swabs soaked in 10% sugar solution. Mortality is recorded 24 hours after the first exposure. The number of dead mosquitoes out of the total in the cage after 24 hours is the percent mortality. Testing is done in triplicates.

Strain Information
*Aedes albopictus*

Formulations
Formulations A-C compared to Control (absence of composition).

Results
Mosquito Landing Inhibition
Data for *Aedes Albopictus* mosquitos are shown in Table 1.

Upon release of Formulation A in room 1, mosquito entry to room 1 from room 2 was reduced by 54% compared to mosquito entry in a room in the absence of formulation A, and, of the mosquitos that entered room 1, landing on the human volunteer was reduced by 90% compared to control (absence of Formulation A).

TABLE 1

Percentage of Landing Inhibition and Reduction of Room Entry in different treatments.

| Formulation | Reduction of Room Entry | Landing Inhibition | Mortality |
|---|---|---|---|
| | *Aedes Albopictus* | | |
| Formulation A | 54% | 90% | 4% |
| Formulation B | 79% | 92% | 0% |
| Formulation C | 50% | 84% | 0% |

Summary of Results
1. All formulations tested in this Example provided about <10% mortality of mosquitos after 24 hours following exposure to the vaporized composition.
2. Among the 3 formulations, Formulation B has the highest room entry reduction and landing inhibition.

Example 2

Efficacy of Formulations A-C Against Southern House Mosquito (*Culex quinquefasciatus*

Methodology
Spatial Repellent Test

The spatial repellent test is carried out in two separate 30 m³ testing rooms, rooms 1 and 2. The rooms are equipped with at least one door connecting the two rooms. The light regime depends on the tested species. The room temperature and relative humidity are regulated.

The composition is placed in room 1 in the apparatus described herein, on the wall near the floor. Free flying aged female mosquitoes are released before the start of the test into neighbouring test room 2. The door between room 1 with the human volunteer and the composition and room 2 with the mosquitoes is opened. Mosquitoes released in room 2 are attracted to the volunteer, having bare arms and legs, in room 1.

Landing Inhibition Test

In the landing inhibition test, the number of mosquitoes landing on the volunteer and/or probing are counted. "Probing" refers to mosquitoes approaching or landing on volunteers for over two seconds. For testing purposes, of the mosquitoes that have entered room 1, landing refers to mosquitoes sitting longer than 2 seconds on the volunteer and/or the biting activity/bite preventive effect of mosquitoes.

Reduction of Room Entry

After the landing inhibition test is conducted, the door is closed and the number of mosquitoes that entered room 1 is determined (counting is divided into unaffected and knocked-down mosquitoes) and mosquitoes are removed.

Mortality

A cage of aged female mosquitoes is placed in room 1 and exposed to the formulation for about 1 hour to observe whether insecticidal effects may be caused by contact/exposure to the formulation. The mosquito cages are then removed from room 1 and the insects are provided with cellulose swabs soaked in 10% sugar solution. Mortality is recorded 24 hours after the first exposure. The number of dead mosquitoes out of the total in the cage after 24 hours is the percent mortality. Testing is done in triplicates.

Strain Information

*Culex quinquefasciatus*

Data Analysis

Formulations

Formulations A-C compared to Control (absence of the composition).

Analysis

Data for *Culex quinquefasciatus* mosquitos are shown in Table 2.

Of the mosquitos released in room 2, mosquitoes that entered room 1 was reduced by 39% compared to control experiment (i.e. mosquitoes in a room that did not contain formulation), and mosquito landing on the human volunteer was inhibited by 90% compared to control mosquitoes (i.e. mosquitoes in a room that did not contain formulation).

TABLE 2

Percentage of Landing Inhibition and Reduction of Room Entry in different treatments.

| Formula | Reduction of Entry Room | Landing Inhibition on person | Mortality |
|---|---|---|---|
| | | *Culex quinquefasciatus* | |
| Formulation A | 39% | 90% | 8% |
| Formulation B | 25% | 88% | 0% |
| Formulation C | 10% | 86% | 7% |

Summary of Results

1. All formulations tested in this Example provided about 10% mortality of mosquitos after 24 hours following exposure to the vaporized composition.

2. Formulation A provided the highest room entry reduction, demonstrating a reduction of 39% of mosquitoes entering room 1 containing one of the formulations described herein compared to control mosquitoes (i.e. rooms not having one of the formulations described herein.) The pyrethrin concentration was linear to the reduction of entry room for *Culex quinquefasciatus* between formulation A and formulation C.

As described above, use of any of Formulations A-C resulted in <10% mortality. Formulations A-C resulted in a reduction of 10% to 39% of *Culex quinquefasciatus* mosquitoes entering room 1 where the formulation was released. Formulations A-C also provided over 85% landing inhibition of *Culex quinquefasciatus* mosquitos on the volunteer.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:

1. A spatial pest repellent composition, consisting of:
about 0.1% to about 1.0% by weight pyrethrins;
about 5% to about 20% by weight p-menthane-3,8-diol;
isopropyl myristate;
hydrocarbon solvent; and
antioxidant;
wherein at least 80% landing inhibition on a person of *Aedes albopictus* and *Culex quinquefasciatus* mosquitos is achieved within 15 minutes of exposure to the vaporized composition;
wherein 24 hours after exposure to the vaporized composition *Aedes albopictus* and *Culex quinquefasciatus* mosquitos experience about <10% mortality.

2. The composition of claim 1, wherein the p-menthane-3,8-diol is about 5% to about 15% by weight.

3. The composition of claim 1, wherein the isopropyl myristate is about 15-25% by weight.

4. The composition of claim 1, wherein the hydrocarbon solvent is about 62% to about 70% by weight.

5. The composition of claim 1, wherein the antioxidant is about 0.5% to about 1.5% by weight.

6. The composition of claim 1, wherein the hydrocarbon solvent is selected from the group consisting of aliphatic $C_9$-$C_{14}$ hydrocarbons, alicyclic $C_9$-$C_{14}$ hydrocarbons, naphtha, petroleum distillate, paraffins, iso-paraffins, isoparaffinic hydrocarbons, cycloparaffins, alkanes, iso-alkanes, cycloalkanes, and any combinations thereof.

7. The composition of claim 1, wherein the antioxidant is selected from the group consisting of 2,6-di-tert-butyl-4-methylphenol (BHT), 3-tert-butyl-4-hydroxyanisole (BHA), 2,2'-methylene-bis(4-ethyl-6-tert-butylphenol), 2,2'-methylene-bis-(4-methyl-6-tert-butylphenol), 4,4'-butylidene-bis (5-methyl-6-tert-butylphenol), 4,4'-methylene-bis(2-methyl-6-tert-butylphenol), 4,4'-thio-bis(3-methyl-6-tert-butylphenol), 4,4'-methylene-bis(2,6-di-tertbutylphenol), stearyl-β(3,5-di-tert-butyl-4-hydroxyphenol)-propionate, 1,3,5-trimethyl-2,4-6-tris(3,5-di-tert-butyl-4-hydroxybenzylbenzene), 1,1,3-tris(2-methyl-4-hydroxy-5-tert-butyl)-butane, tetrakis [methylene(3,5-di-tert-butyl-4-hydroxycinnimate)]methane, dilauryl thiodipropionate, and distearyl thiodipropionate.

8. A method of repelling an invertebrate pest from a space comprising heating a pest repellent composition using a heating element, wherein the pest repellent composition is the spatial pest repellant composition according to claim 1, and wherein the pest repellent composition is vaporized into the space and invertebrate pests are repelled therefrom.

9. The method of claim 8, wherein the heating element is a resistive heating element.

10. The method of claim 8, wherein the composition further comprises about 62% to about 70% by weight hydrocarbon solvent.

11. The method of claim 8, wherein the invertebrate pest is a mosquito.

12. The method of claim 11, wherein the mosquito is selected from the group consisting of *Culex quinquefasciatus* mosquitos and *Aedes albopictus* mosquitos.

13. The method of claim 12, wherein at least 85% landing inhibition on a person of *Culex quinquefasciatus* mosquitos is achieved within 15 minutes of exposure to the vaporized pest repellent composition.

14. An apparatus, comprising:
a heating element adjacent to a first end of a wick and a reservoir enclosing a second end of the wick, the reservoir comprising, and in contact with the second end of the wick, a spatial pest repellant composition according to claim 1, wherein upon application of an electric current to the heating element the pest repellent composition is vaporized from the wick.

15. The apparatus of claim 14, wherein the heating element is a resistive heating element.

\* \* \* \* \*